United States Patent [19]
Saibara et al.

[11] Patent Number: 5,964,930
[45] Date of Patent: Oct. 12, 1999

[54] BLACK PIGMENT INK AND METHOD FOR PRODUCING THE SAME

[75] Inventors: Shoji Saibara, Toride; Shigeo Aoyama, Ibaraki-ken; Yuichi Sakurai, Toride; Kouji Takazawa, Abiko, all of Japan

[73] Assignee: Hitachi Maxell, Ltd., Osaka, Japan

[21] Appl. No.: 08/794,785

[22] Filed: Feb. 3, 1997

[30] Foreign Application Priority Data

Nov. 20, 1996 [JP] Japan ..................................... 8-046643
Nov. 20, 1996 [JP] Japan ..................................... 8-309429

[51] Int. Cl.$^6$ .................................................. C09D 11/02
[52] U.S. Cl. ..................................... 106/31.75; 106/31.86; 106/31.89; 106/31.9
[58] Field of Search ............................ 106/31.86, 31.89, 106/31.9, 31.75

[56] References Cited

U.S. PATENT DOCUMENTS

| | | | |
|---|---|---|---|
| 4,508,570 | 4/1985 | Fujii et al. | 106/31.58 |
| 4,509,982 | 4/1985 | Iijima | 106/31.86 |
| 5,129,948 | 7/1992 | Breton et al. | 106/31.75 |
| 5,250,109 | 10/1993 | Chan et al. | 106/31.75 |
| 5,281,262 | 1/1994 | Saito | 106/31.86 |
| 5,356,464 | 10/1994 | Hickman et al. | 106/31.75 |

FOREIGN PATENT DOCUMENTS 3-210373   9/1991   Japan .

*Primary Examiner*—Helene Klemanski
*Attorney, Agent, or Firm*—Birch, Stewart, Kolasch & Birch, LLP

[57] ABSTRACT

Disclosed is a black pigment ink suitable for ink jet recording which comprises carbon black, a dispersant containing polyethylene oxide and 0.1–5 mmols/g of amino group, and a solvent such as water. The ink is excellent in storage stability, causes no clogging of head and provides printed images of excellent quality and high light resistance.

14 Claims, No Drawings

BLACK PIGMENT INK AND METHOD FOR PRODUCING THE SAME

BACKGROUND OF THE INVENTION

The present invention relates to a black pigment ink, particularly, to an ink suitable for ink jet recording which is carried out by squirting ink droplets from a printing head, and, more particularly, to a black pigment ink which can give printed images of excellent quality and high light resistance.

In the conventional ink jet recording, dye inks prepared by dissolving various dyes in water or mixed solvents of water and organic solvents have been used.

However, dye inks have the disadvantage that they are apt thereby blot on the recording paper to deteriorating the quality of the resulting printed images, and furthermore, the resulting images are inferior in light resistance and water resistance.

Under these circumstances, an investigation has been made to prepare pigment inks which have less blotting and can provide printed images which are excellent in quality and high in both light and water resistance. However, conventional pigment inks suffer from poor dispersibility and dispersion stability of the pigment particles in the ink and, furthermore, they are likely to cause clogging of the printing head. One of the methods for the solution of these problems is proposed in JP-A-3-210373. It discloses an aqueous pigment ink prepared using acidic carbon black. The reference teaches that acidic carbon black enhances affinity of the pigment particles per se for an aqueous solvent, resulting in improved image density.

However, the aqueous pigment ink disclosed in JP-A-3-210373 is soluble in an aqueous solution and is prepared by dissolving an amine in a dispersant and the dispersant, per se, has an acidic polar group such as carboxyl group. Since both the pigment and the dispersant have acidity, the dispersibility of the dispersant for pigment is not so high. As a result, clogging at the printing head is apt to occur and, further, the resultant printed images are insufficient in quality.

SUMMARY OF THE INVENTION

The object of the present invention is to provide a black pigment ink used for ink jet recording and capable of producing printed images excellent in quality, light resistance and storage stability for a long period of time, and which causes no clogging of the printing head.

The present invention provides a black pigment ink which is a solution comprising a carbon black, a dispersant containing polyethylene oxide and 0.1–5 mmols/g of an amino group and a solvent such as water and a process for producing the same.

DETAILED DESCRIPTION OF THE INVENTION

According to the intensive research conducted by the inventors, a polar group (hereinafter a volatile constituent) is present on the surface of carbon black. The amount of the volatile constituent increases or decreases depending on the sort of carbon blacks, but if a carboxyl group, phenol group, quinone group or the like is present and the dispersant contains an amino group, dispersibility of carbon black is improved. Due to the effect of the amino group, an ink high in dispersion stability of pigment particles can be prepared by using a dispersant mainly composed of polyethylene oxide and containing 0.1–5 mmols/g of an amino group according to the present invention. In this ink, once settled pigment can be easily redispersed. Thus, it becomes possible to uniformly disperse carbon black with a low viscosity, and as a result, the present invention can provide a black pigment ink which forms printed images of excellent quality, is high in storage stability and causes no clogging of printing head because the once settled pigment can be easily redispersed.

Moreover, it is presumed that the dispersant containing amino group of the present invention is adsorbed to the polar group on the surface of carbon black and the polyethylene oxide in the dispersant of the present invention reduces the cohesive force between carbon black particles per se by the steric repulsion force.

As the carbon blacks used in the present invention, there can be equally used those which are conventionally known.

The amount of the carbon black of the present invention is generally 0.1–20% by weight, preferably 1.0–10% by weight based on the total ink composition. When the amount is within this range, color tone and optical density as an ink are satisfied and, furthermore, viscosity and storage stability of the pigment ink are satisfactory.

The amount of the amino group in the dispersant of the present invention is preferably 0.1–5 mmols/g. When it is within this range, dispersibility of carbon black particles can be improved.

The amino group in the dispersant can improve the dispersibility of carbon black particles irrespective of whether it is a primary, secondary, tertiary or quaternary salt. Particularly, in the case of tertiary amino group or quaternary ammonium salt group which are weak in basicity, there can be prepared pigment inks to which a compound sensitive to pH can be added.

Among the dispersants used in the present invention, those in which an aminophenyl group bonds to one end are very effective for the improvement of dispersibility of carbon black particles. Carbon blacks have aromatic rings such as phenyl group and naphthyl on the surface regardless of the process of preparation. Therefore, the aminophenyl group is adsorbed to the polar group and/or the aromatic ring on the surface of carbon black and this makes it possible to disperse the carbon black particles more effectively.

The dispersant used in the present invention preferably has a molecular weight of 1000–8000. When the molecular weight is in this range, dispersibility and dispersion stability of the pigment particles in the pigment ink can be enhanced. The proportion of polyethylene oxide in the dispersion is generally 55–99% by weight, preferably 70–90% by weight based on the total weight. Within this range, cohesive force between the carbon black particles per se can be reduced and the storage stability of the ink can be satisfied.

The dispersant used in the present invention can be prepared by any synthesis processes and can have any structures as far as it contains polyethylene oxide as a main component and contains 0.1–5 mmols/g of an amino group. As examples, mention may be made of dimethylamino group-containing polyethylene oxides obtained by esterification reaction of dimethylaminobenzoic acid or dimethylaminophthalic acid with polyethylene oxide the one end of which is hydroxyl group.

The amount of the dispersant is generally 0.1–20% by weight, preferably 0.1–15% by weight based on the total ink composition. Within this range, the dispersibility and dispersion stability of carbon black particles can be enhanced.

The black pigment ink of the present invention is prepared by dispersing a solution containing a carbon black, a dispersant containing polyethylene oxide as a main component and containing 0.1–5 mmols/g of amino group, and water, if necessary, with addition of various additives. It can be also prepared by first preparing a dispersion of high pigment concentration and diluting it with the addition of the solvent and various additives.

The particle diameter of carbon black in the black pigment ink of the present invention may be 100 nm or less. If the particle size exceeds 100 nm, precipitates of carbon black particles are sometimes formed during storage of the ink for a long period of time.

As dispersing devices for producing the black pigment ink of the present invention, there may be employed any generally used dispersing devices. They include, for example, container-driving medium mills such as roll mill, ball mill, centrifugal mill and planetary ball mill, high-speed rotary mills such as sand mill, and medium-agitation mills such as agitation tank type mill. A specific process for producing the black pigment ink comprises carrying out the dispersion of an ink with a planetary ball mill or sand mill using ceramic beads of 0.01–1.0 mm in particle diameter. It is preferred that in the case of using the planetary ball mill, the dispersion is carried out at an acceleration of 5–50 G and in the case of the sand mill, it is carried out at a peripheral speed of 5–20 m/s with a filling rate of the ceramic beads of 50–90%.

The black pigment ink of the present invention can be further improved in dispersibility and long-term storage stability by adding an amphiphilic compound the hydrophilic portion of which is polyethylene oxide and the hydrophobic portion of which contains an aromatic ring. The mechanism of the amphiphilic compound exhibiting the above effect is not clear, but it can be presumed that since carbon black has an aromatic ring such as a phenyl group or naphthyl group on the surface irrespective of the processes of the preparation thereof, when the dispersant contains an aromatic ring, interaction is generated between the aromatic ring on the surface of carbon black and the aromatic ring in the dispersant to weaken the cohesive force between the carbon black particles.

The amount of the amphiphilic compound used in the present invention is generally 0.1–20% by weight, preferably 0.1–10% by weight based on the total ink composition. Within this range, even if carbon blacks differ in volatile content, dispersibility and dispersion stability of the carbon black particles can be enhanced.

The amphiphilic compound of the present invention preferably has an HLB of 10–20. When the HLB is in this range, the dispersibility and dispersion stability of carbon black particles can be enhanced.

The surface tension of the black pigment ink obtained in the present invention is preferably 20–70 dynes/cm. Furthermore, the viscosity is usually 10 cP or less, more preferably 5 cP or less at 25° C. Since water is ordinarily used as solvent, viscosity of the ink is 1 cP or more. The black pigment ink obtained in the present invention which possesses the above surface tension and viscosity makes it possible to carry out stable printing by ink jet printers.

In the present invention, water or mixed solvents comprising water and organic solvents are used as solvents. As the organic solvents used in the mixed solvents, mention may be made of, for example, ethylene glycol, diethylene glycol glycerin, triethylene glycol, tripropylene glycol, dimethyl sulfoxide, diacetone alcohol, glycerin monoallyl ether, propylene glycol, polyethylene glycol, thiodiglycol, N-methyl-2-pyrrolidone, 2-pyrrolidone, γ-butyrolactone, 1,3-dimethyl-2-imidazolidinone, sulfolane, trimethylolpropane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxyethylurea, urea, acetonylacetone, pentaerythritol, hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monopropyl ether, dipropylene glycol monobutyl ether, tripropylene glycol monomethyl ether, glycerin monoacetate, glycerin diacetate, glycerin triacetate, ethylene glycol monomethyl ether acetate, diethylene glycol monomethyl ether acetate, cyclohexanol, 1-butanol, 2,5-hexanediol, methanol, ethanol, n-propanol, 2-propanol, 1-methoxy-2-propanol, furfuryl alcohol, tetrahydrofurfuryl alcohol, 1,2-butanediol, 1,4-butanediol, 1,3-butanediol, 2,4-pentanediol, 1,5-pentanediol, 2-methyl-2,4-pentanediol, 1,2-cyclohexanediol, 1,4-cyclohexanediol, trimethylolethane, trimethylolpropane, 1,2,4-butanetriol, 1,2,6-hexanetriol, 1,2,5-pentanetriol, 3-methyl-1,5-pentanediol, 3-hexene-2,5-diol, acetone, methyl ethyl ketone, tetrahydrofuran, dioxane, ethyl acetate, propylene carbonate, dimethyl sulfoxide, and dimethylformamide.

In the ink of the present invention, it is also possible to use various additives conventionally used in inks for ink jet printers, such as surface active agent, clogging inhibitor for printing head, anti-foaming agent, drying inhibitor, fungicide, humectant, pH adjustor and water-resistance-imparting agent for printed images.

The ink of the present invention can be utilized not only as ink for ink jet printers, but also as general aqueous printing ink or coating composition. Furthermore, the black pigment ink obtained by the process of the present invention can also be used as non-aqueous ink or coating composition by exchanging the aqueous solvent.

DESCRIPTION OF PREFERRED EMBODIMENTS

The present invention will be explained in more detail by the following examples.

The dispersants synthesized are shown below. In Synthesis Examples 1 and 2, the dispersants were prepared by the esterification reaction of dimethylaminobenzoic acid with polyethylene oxide the one end of which is a hydroxyl group, and in Synthesis Example 3, the dispersant was prepared by the esterification reaction of dimethylaminophthalic acid with polyethylene oxide the one end of which is a hydroxyl group.

Synthesis Example 1

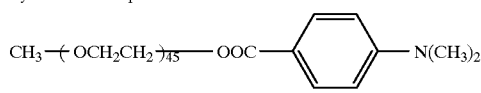

(1)

Synthesis Example 2

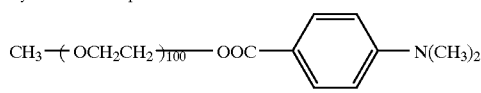

(2)

Synthesis Example 3

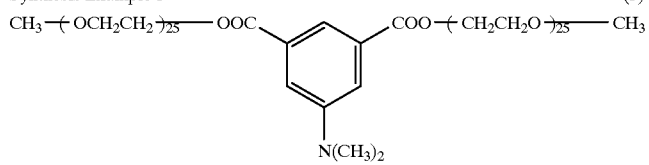

(3)

EXAMPLE 1

The following components were dispersed for 4 hours by a sand mill using zirconia beads of 0.3 mm in particle diameter to obtain a dispersion.

|  | Part by weight |
| --- | --- |
| Carbon black (Printex 150T manufactured by Degussa, Inc.) | 10 |
| The dispersant obtained in Synthesis Example 1 | 12 |
| Deionized water | 78 |

Ten parts by weight of diethylene glycol and 60 parts by weight of deionized water were added dropwise to 30 parts by weight of the resulting dispersion with stirring over a period of 30 minutes to obtain an ink.

EXAMPLE 2

An ink was obtained in the same manner as in Example 1, except that the carbon black used in Example 1 was changed to Special Black 4A (manufactured by Degussa, Inc.).

EXAMPLE 3

An ink was obtained in the same manner as in Example 1, except that the dispersant used in Example 1 was changed to the dispersant obtained in Synthesis Example 2.

EXAMPLE 4

An ink was obtained in the same manner as in Example 1, except that the dispersant used in Example 1 was changed to the dispersant obtained in Synthesis Example 3.

EXAMPLE 5

The following components were dispersed by a sand mill using zirconia beads of 0.3 mm in particle diameter for 4 hours to obtain a dispersion.

|  | Part by weight |
| --- | --- |
| Carbon black (Printex 150T manufactured by Degussa, Inc.) | 10 |
| The dispersant obtained in Synthesis Example 1 | 12 |
| Amphiphilic compound (Nonypole 400, HLB: 17.8, manufactured by Sanyo Kasei Co., Ltd.) | 2 |
| Deionized water | 76 |

Ten parts by weight of diethylene glycol and 60 parts by weight of deionized water were added dropwise to 30 parts by weight of the resulting dispersion with stirring over a period of 30 minutes to obtain an ink.

COMPARATIVE EXAMPLE 1

An ink was obtained in the same manner as in Example 1, except that 15 parts by weight of a styrene-acrylic acid-butyl acrylate copolymer (acid value: 60 and weight-average molecular weight: 13000) was used in place of the dispersant used in Example 1.

The particle diameter of the pigment in the ink obtained in each of the above examples and comparative example, storage stability of the ink, occurrence or unoccurrence of clogging of the head, quality of the printed images, viscosity of the ink and light resistance of the printed images are shown in Table 1.

TABLE 1

|  | Particle diameter (nm) | Storage stability | Redispersibility | viscosity (cps) | Clogging | Quality of printed image | Light resistance |
| --- | --- | --- | --- | --- | --- | --- | --- |
| Example 1 | 33 | ○ | ○ | 2.2 | ○ | 1.4 | ○ |
| Example 2 | 29 | ○ | ○ | 2.8 | ○ | 1.4 | ○ |
| Example 3 | 31 | ○ | ○ | 2.0 | ○ | 1.4 | ○ |
| Example 4 | 35 | ○ | ○ | 2.1 | ○ | 1.03 | ○ |
| Example 5 | 31 | □ | ○ | 2.3 | ○ | 1.3 | ○ |

TABLE 1-continued

| | Particle diameter (nm) | Storage stability | Redispersibility | viscosity (cps) | Clogging | Quality of printed image | Light resistance |
|---|---|---|---|---|---|---|---|
| Comparative Example 1 | 150 | x | Δ | 10.5 | x | <1.0 | ○ |

In the above Table, the particle diameter of pigment is determined using a scanning electron microscope (S-4000 manufactured by Hitachi Ltd.). With regard to the storage stability, the ink is filled in a sample tube at a depth of 10 cm and an acceleration of 10000 G is applied thereto for 10 minutes, and when the pigment is completely settled, this is expressed by x, when the pigment is not settled at all, this is expressed by □ and the other cases are expressed by ○. The redispersibility is evaluated by forcedly settling the pigment by subjecting the ink to centrifugal treatment at 10000 G for 3 hours using a centrifugal machine, and ○ indicates that the pigment is readily redispersed and Δ indicates that the redispersion is difficult. The viscosity is measured by a viscometer (R100 manufactured by Toki Sangyo Co., Ltd.) at 25° C. As for the clogging of head, after a certain quantity of letters are printed, the head is left to stand for 1 day at 50° C. without capping and, then, subjected to cleaning operation for getting rid of the clogging, and the number of the cleaning operations before normal printing becomes possible is examined. When the normal printing becomes possible after cleaning operations of 1–5 times, this is indicated by ○; when the normal printing becomes possible after cleaning operations of 6–10 times, this is indicated by Δ; and when the normal printing becomes possible after cleaning operations of 11 times or more, this is indicated by x. Regarding the quality of printed image, optical density of a recorded pattern printed on a paper by an ink jet printer is measured by Macbeth portable densitometer (RD-12000 manufactured by Sakata Inks Co., Ltd.). With reference to the light resistance, the recorded pattern used for evaluation of the quality of printed image is exposed to a xenon lamp and optical density when irradiation energy reaches 500 KJ/m$^2$ is measured, and when deterioration of the optical density is less than 15% based on the initial optical density, this is indicated by ○.

As is clear from these results, since in the black pigment ink of the present invention, carbon black is dispersed in a dispersant mainly composed of polyethylene oxide and containing 0.1–5 mmols/g of amino group, the ink is excellent in storage stability, causes no clogging of head and provides printed images of excellent quality and high light resistance.

What is claimed is:

1. A black pigment ink which comprises a carbon black, 0.1–20% by weight based on the total weight of the ink composition of a dispersant containing polyethylene oxide and 0.1–5 mmols/g of an amino group, and a solvent;
   wherein the carbon black is in the form of ultrafine particles having a particle diameter of 100 nm or less.

2. A black pigment ink according to claim 1, wherein the solvent is water.

3. A black pigment ink according to claim 1, wherein the dispersant contains 55–99% by weight of polyethylene oxide.

4. A black pigment ink according to claim 1, wherein the dispersant has a molecular weight of 1000–8000.

5. A black pigment ink according to claim 1, wherein the amino group of the dispersant is a tertiary amino group or a quaternary ammonium salt group.

6. A black pigment ink according to claims 1–4, wherein the amino group of the dispersant is an aminophenyl group which bonds to one end of the dispersant.

7. A black pigment ink according to claim 1 which additionally contains an amphiphilic compound having a hydrophilic portion which is polyethylene oxide and a hydrophobic portion which contains an aromatic ring.

8. A black pigment ink according to claim 7, wherein the amphiphilic compound has an HLB of 10–20.

9. A black pigment ink according to claim 1 which has a viscosity of 10 cP or lower at 25° C.

10. A process for producing a black pigment ink which comprises dispersing a carbon black, 0.1–20% by weight based on the total weight of the ink composition of a dispersant containing polyethylene oxide and 0.1–5 mmols/g of an amino group and a solvent, in the presence of ceramic beads having a particle diameter of 0.01–1.0 mm;
    wherein the carbon black is in the form of ultrafine particles having a particle diameter of 100 nm or less.

11. A process according to claim 10, wherein water is used as the solvent.

12. The black pigment ink according to claim 1, wherein the dispersant is present in an amount of 0.1–15% by weight based on the total weight of the ink composition.

13. The process according to claim 10, wherein the dispersant is present in an amount of 0.1–15% by weight based on the total weight of the ink composition.

14. A process for printing a black pigment ink which comprises squirting ink droplets from a printing head, wherein the black pigment comprises:
    a carbon black, 0.1–20% by weight based on the total weight of the ink composition of a dispersant containing polyethylene oxide and 0.1–5 mmols/g of an amino group, and a solvent;
    wherein the carbon black is in the form of ultrafine particles having a particle diameter of 100 nm or less.

\* \* \* \* \*